United States Patent
Mendonca et al.

(10) Patent No.: US 8,923,577 B2
(45) Date of Patent: Dec. 30, 2014

(54) METHOD AND SYSTEM FOR IDENTIFYING REGIONS IN AN IMAGE

(75) Inventors: Paulo Ricardo Mendonca, Clifton Park, NY (US); Rahul Bhotika, Albany, NY (US); Wesley David Turner, Rexford, NY (US); Jingbin Wang, Allston, MA (US); Saad Ahmed Sirohey, Pewaukee, WI (US)

(73) Assignee: General Electric Company, Niskayuna, NY (US)

( * ) Notice: Subject to any disclaimer, the term of this patent is extended or adjusted under 35 U.S.C. 154(b) by 2517 days.

(21) Appl. No.: 11/558,715

(22) Filed: Nov. 10, 2006

(65) Prior Publication Data

US 2008/0080770 A1     Apr. 3, 2008

Related U.S. Application Data

(60) Provisional application No. 60/847,777, filed on Sep. 28, 2006.

(51) Int. Cl.
*G06K 9/00* (2006.01)
*G06K 9/34* (2006.01)
*G06T 7/00* (2006.01)

(52) U.S. Cl.
CPC ............. *G06T 7/0081* (2013.01); *G06T 7/0012* (2013.01); *G06T 7/0087* (2013.01); *G06T 2207/10081* (2013.01); *G06T 2207/30028* (2013.01); *G06T 2207/30061* (2013.01)
USPC ......................................................... 382/128

(58) Field of Classification Search
USPC ......................................... 382/128–132, 162
See application file for complete search history.

(56) References Cited

U.S. PATENT DOCUMENTS

| | | | |
|---|---|---|---|
| 5,255,187 | A | 10/1993 | Sorensen |
| 5,617,459 | A | 4/1997 | Makram-Ebeid et al. |
| 5,823,993 | A | 10/1998 | Lemelson |
| 5,917,929 | A | 6/1999 | Marshall et al. |
| 6,266,435 | B1 | 7/2001 | Wang |
| 6,272,233 | B1 | 8/2001 | Takeo |
| 6,320,976 | B1 | 11/2001 | Murthy et al. |
| 6,434,262 | B2 | 8/2002 | Wang |
| 6,817,982 | B2 | 11/2004 | Fritz et al. |
| 6,865,300 | B2 | 3/2005 | Kokemohr |

(Continued)

FOREIGN PATENT DOCUMENTS

| | | | |
|---|---|---|---|
| JP | 7323024 | A | 12/1995 |
| JP | 8052127 | A | 2/1996 |

(Continued)

OTHER PUBLICATIONS

Paulo et al. ("Model-based analysis of local shape for lesion detection in CT scans", MICCAI, vol. 3749, pp. 688-695, Oct. 2005).*

(Continued)

*Primary Examiner* — Amara Abdi
(74) *Attorney, Agent, or Firm* — Melissa K. Dobson (57) ABSTRACT

A method and system for visualizing regions in an image is provided. The method comprises computing a regional response around a region in the image, deriving a region score based on from the regional response for the region and labeling the region in the image by comparing the region score to a plurality of probabilistic models.

33 Claims, 3 Drawing Sheets

(56) References Cited

U.S. PATENT DOCUMENTS

| | | | |
|---|---|---|---|
| 6,944,330 B2 * | 9/2005 | Novak et al. | 382/162 |
| 6,983,063 B1 | 1/2006 | Novak et al. | |
| 7,024,027 B1 | 4/2006 | Suri et al. | |
| 7,058,210 B2 | 6/2006 | Mundy et al. | |
| 7,233,191 B2 | 6/2007 | Wang et al. | |
| 7,298,879 B2 | 11/2007 | Wiemker | |
| 2003/0179021 A1 | 9/2003 | Braun et al. | |
| 2004/0146193 A1 | 7/2004 | Imamura et al. | |
| 2004/0151356 A1 | 8/2004 | Li et al. | |
| 2005/0105788 A1 * | 5/2005 | Turek et al. | 382/131 |
| 2006/0079743 A1 | 4/2006 | Ferrant et al. | |

FOREIGN PATENT DOCUMENTS

| | | | |
|---|---|---|---|
| JP | 11056828 A | 3/1999 | |
| JP | 2003225231 A | 8/2003 | |
| JP | 2004222776 A | 8/2004 | |
| JP | 2004283188 A | 10/2004 | |
| JP | 2005246032 A | 9/2005 | |
| JP | 2006506163 A | 2/2006 | |
| WO | WO2007137569 A1 | 12/2007 | |

OTHER PUBLICATIONS

H. Yoshida and J. Nappi, "Three-Dimensional Computer-Aided Diagnosis Scheme for Detection of Colonic Polyps", IEEE Transactions on Medical Imaging, vol. 20, No. 12, Dec. 2001, pp. 1261-1274.

Staal et al., "Ridge-Based Vessel Segmentation in Color Images of the Retina", IEEE Transactions on Medical Imaging, vol. 23, No. 4, Apr. 2004, pp. 501-509.

Paulo R. S. Mendonca et al., "Model-Based Analysis of Local Shape for Lesion Detection in CT Scans", Medical Image Computing and Computer-Assisted Intervention, vol. 3749 in Lecture Notes in Computer Science, Oct. 2005, pp. 688-695.

Li et al., "Lung Cancers Missed at Low-Doe Helical CT Screening in a Gen. Pop: Comp. of Clinical, Histopathologic, and Imaging Findings", Radiology, vol. 225, No. 3, pp. 673-683, 2002.

Kakinuma et al., "Detection Failures in Spiral CT Screening for Lung Cancer: Analysis of CT Findings", Radiology, vol. 212, pp. 61-66, 1999.

Sato et al., "Three-dimension Multi-scale Line Filter for Segmentation and Visualization of Curvilinear Structures in Med. Images", Med. Image Analysis, vol. 2, pp. 143-168, 1998.

Li et al., "Selective Enhancement Filters for Nodules, Vessels, and Airway Walls in Two- and Three-Dimensional CT Scans", Med. Phys., vol. 30, No. 8, pp. 2040-2051, 2003.

McCulloch et al., "Reader Variability and Computer Aided Detection of Suspicious Lesions in Low-Doe CT Lung Screening Exams", Radiology, vol. 226, No. 2: 37A, 1 page, 2003.

Intellectual Property Office Search Report dated Aug. 25, 2010.

Werner et al., "A New, Universal and Fast Switching Gate-Drive Concept for SiC-JFETs Based on Current Source Principle", Power Electronics Specialists Conference, (IEEE), pp. 2640-2645, 2006.

\* cited by examiner

METHOD AND SYSTEM FOR IDENTIFYING REGIONS IN AN IMAGE

CROSS REFERENCE TO RELATED APPLICATIONS

This application is related to Provisional Application U.S. Ser. No. 60/847,777, entitled "Local Anatomical Signatures", filed Sep. 28, 2006, the contents of which are herein incorporated by reference and the benefit of priority to which is claimed under 35 U.S.C. 119(e).

STATEMENT REGARDING FEDERALLY SPONSORED RESEARCH & DEVELOPMENT

The US Government may have certain rights in this invention pursuant to subcontract number 1-0378 under prime contract number W81XWH-1-0378 awarded by the Department of Defense.

BACKGROUND

The invention relates generally to methods and an apparatus for identifying regions in images, and more particularly to methods and apparatus for labeling anatomical structures in medical images.

In many imaging applications, specifically medical imaging applications, the images are often analyzed to identify various anatomical structures such as organs, lesions, etc. For example, a chest X-ray radiograph or a computed tomography (CT) image can be employed to facilitate the detection of lung cancer. Specifically, CT images advantageously provide a description of anatomy in great detail and consequently is being increasingly are used for detecting and following the evolution of lesions that may lead to potential cancers.

For example, for the detection of lung and colon cancer, radiologists search for the presence of nodules and polyps in the lung and colon using advanced lung analysis (ALA) and computed tomographic colonography (CTC) techniques. Radiologists detect nodules in the lung by viewing axial slices of the chest. However, CT systems generally provide several images for a single CT scan. Consequently, a considerable amount of information is presented to the radiologist for use in interpreting the images and detecting suspect regions that may indicate disease. The considerable amount of data associated with a single CT scan presents a time-consuming process to the radiologist. Furthermore, this substantial amount of data may disadvantageously lead to missed cancer detection, as it is difficult to identify a suspicious area in an extensive amount of data. In addition, the sheer size of the CT volumes results in significant variability in radiological readings and clinically important nodules are missed.

Techniques variously described as computer aided detection, or computer assisted detection or computer assisted diagnosis, and often referred to by the acronym "CAD" have emerged as a viable approach for aiding the radiologists in the detection of lung nodules in chest radiographs and thoracic CT scans, as well as for detecting and diagnosing other anatomies and disease states.

Several CAD techniques have been developed to highlight the anatomical structures present in various regions in the image. In one specific technique, the regions are identified and labeled according to the local shape of their surrounding structures. In one more specific technique used to identify lung cancer, an Eigen analysis of a Hessian matrix is used as a tool to classify voxels as belonging to a vessel or a nodule. However, such techniques consider a very small neighborhood of each voxel needed to compute image derivatives and thus are not very robust and/or accurate in identifying the structures.

It may therefore be desirable to develop a robust technique and system for processing image data that advantageously facilitates substantially superior initial shape-based identification of regions in an image that can be consequently used for the analysis of the object being examined.

BRIEF DESCRIPTION

Briefly, according to one embodiment of the invention, a method for assigning labels to regions in an image is provided. The method comprises deriving a probabilistic model for a plurality of geometrical structures, computing a regional response around a region in the image, computing a region score for each geometrical structure using the plurality of probabilistic models and labeling the region in the image based on the region score.

In another embodiment, a medical imaging system for labeling anatomical structures in an image is provided. The system comprises an image processor configured to compute a regional response around a voxel of interest in the image, compute a voxel score for each anatomical structures based on a plurality of probabilistic models, label the voxel in the image based on the region score and a display unit configured to display the image including the labeled anatomical regions.

In another embodiment, a computed tomography (CT) system for labeling anatomical structures in a CT image is provided. The system comprises an image processor configured to compute a regional response around a voxel of interest in the CT image, compute a voxel score for each anatomical structures based on a plurality of probabilistic models, label the voxel in the image based on the region score. The system further comprises a display unit configured to display the CT image including the labeled anatomical structures.

In another embodiment, a computer-readable medium storing computer instructions for instructing a computer system to labeling regions in an image. The computer instructions include deriving a probabilistic model for a plurality of geometrical structures, computing a regional response around a region in the image, computing a region score for each geometrical structure using the plurality of probabilistic models and labeling the region in the image based on the region score.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
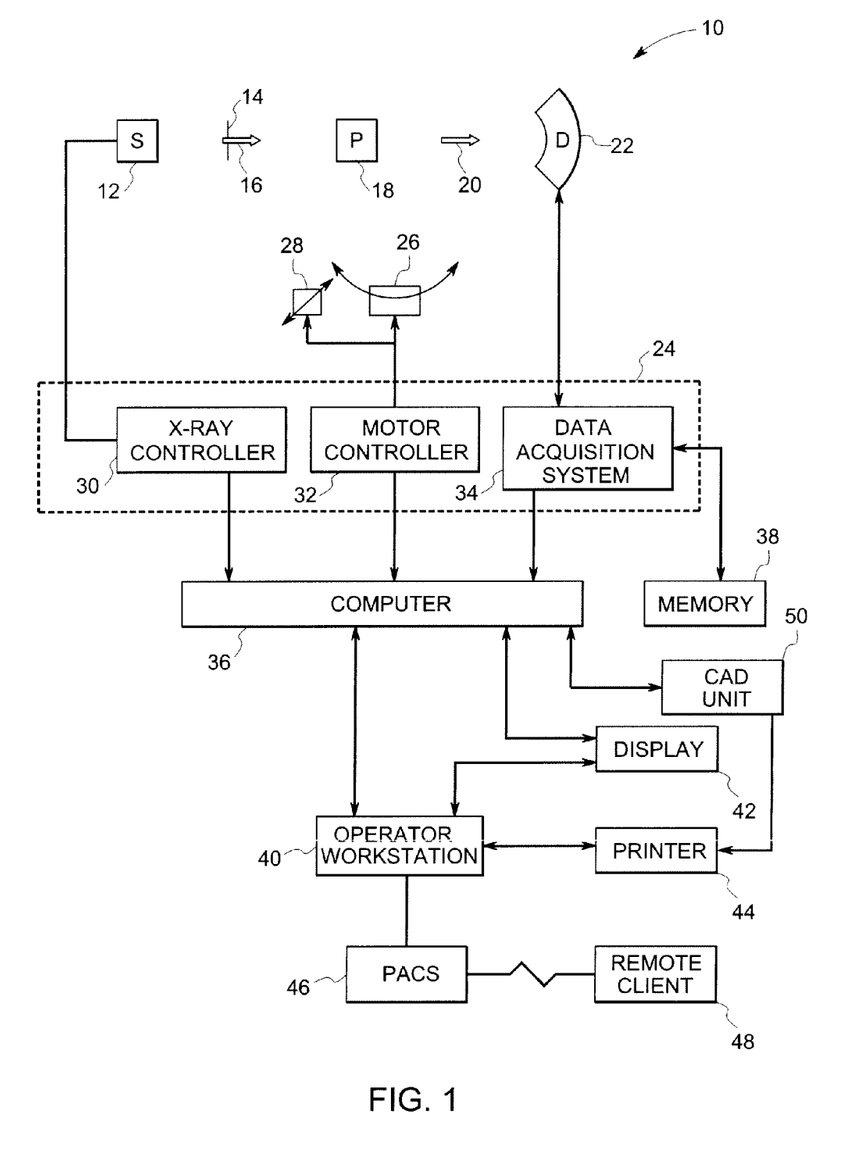
FIG. 1 is a diagrammatical view of an exemplary imaging system in the form of a CT imaging system for use in producing processed images and for analyzing the images and their underlying image data in accordance with aspects of the present technique.

FIG. 1 is a block diagram showing an imaging system 10 for acquiring and processing image data such as medical image data in accordance with the present technique. However, as will be appreciated by one skilled in the art, image data may also include seismic image data or topological image date. In the illustrated embodiment, the system 10 is a computed tomography (CT) system designed to acquire X-ray projection data, to reconstruct the projection data into an image, and to process the image data for display and analysis in accordance with the present technique. In the embodiment illustrated in FIG. 1, the imaging system 10 includes a source of X-ray radiation 12. In one exemplary embodiment, the source of X-ray radiation 12 is an X-ray tube. In other embodiments, the source of X-ray radiation 12 may be one or more solid-state X-ray emitters or, indeed, any other emitter capable of generating X-rays having a spectrum and energy useful for imaging a desired object.

The source of radiation 12 may be positioned near a collimator 14, which may be configured to shape a stream of radiation 16 that is emitted by the source of radiation 12. The stream of radiation 16 passes into the imaging volume containing the subject to be imaged, such as a human patient 18. The stream of radiation 16 may be generally fan-shaped or cone-shaped, depending on the configuration of the detector array, discussed below, as well as the desired method of data acquisition. A portion 20 of radiation passes through or around the subject and impacts a detector array, represented generally at reference numeral 22. Detector elements of the array produce electrical signals that represent the intensity of the incident X-ray beam. These signals are acquired and processed to reconstruct an image of the features within the subject.

The radiation source 12 is controlled by a system controller 24, which furnishes both power, and control signals for CT examination sequences. Moreover, the detector 22 is coupled to the system controller 24, which commands acquisition of the signals generated in the detector 22. The system controller 24 may also execute various signal processing and filtration functions, such as for initial adjustment of dynamic ranges, interleaving of digital image data, and so forth. In general, system controller 24 commands operation of the imaging system to execute examination protocols and to process acquired data. In the present context, system controller 24 also includes signal processing circuitry, typically based upon a general purpose or application-specific digital computer, associated memory circuitry for storing programs and routines executed by the computer, as well as configuration parameters and image data, interface circuits, and so forth.

In the embodiment illustrated in FIG. 1, the system controller 24 is coupled via a motor controller 32 to a rotational subsystem 26 and a linear positioning subsystem 28. In one embodiment, the rotational subsystem 26 enables the X-ray source 12, the collimator 14 and the detector 22 to be rotated one or multiple turns around the patient 18. In other embodiments, the rotational subsystem 26 may rotate only one of the source 12 or the detector 22 or may differentially activate various X-ray emitters and/or detector elements arranged in a ring about the imaging volume. In embodiments in which the source 12 and/or detector 22 are rotated, the rotational subsystem 26 may include a gantry. Thus, the system controller 24 may be utilized to operate the gantry. The linear positioning subsystem 28 enables the patient 18, or more specifically a patient table, to be displaced linearly. Thus, the patient table may be linearly moved within the gantry to generate images of particular areas of the patient 18.

Additionally, as will be appreciated by those skilled in the art, the source of radiation 12 may be controlled by an X-ray controller 30 disposed within the system controller 24. Particularly, the X-ray controller 30 is configured to provide power and timing signals to the X-ray source 12.

Further, the system controller 24 is also illustrated comprising a data acquisition system 34. In this exemplary embodiment, the detector 22 is coupled to the system controller 24, and more particularly to the data acquisition system 34. The data acquisition system 34 receives data collected by readout electronics of the detector 22. The data acquisition system 34 typically receives sampled analog signals from the detector 22 and converts the data to digital signals for subsequent processing by a computer 36.

The computer 36 typically is coupled to or incorporates the system controller 24. The data collected by the data acquisition system 34 may be transmitted to the computer 36 for subsequent processing and reconstruction. The computer 36 may include or communicate with a memory 38 that can store data processed by the computer 36 or data to be processed by the computer 36. It should be understood that any type of memory configured to store a large amount of data might be utilized by such an exemplary system 10. Moreover, the memory 38 may be located at the acquisition system or may include remote components, such as network accessible memory media, for storing data, processing parameters, and/or routines for implementing the techniques described below.

The computer 36 may also be adapted to control features such as scanning operations and data acquisition that may be enabled by the system controller 24. Furthermore, the computer 36 may be configured to receive commands and scanning parameters from an operator via an operator workstation 40, which is typically equipped with a keyboard and other input devices (not shown). An operator may thereby control the system 10 via the input devices. Thus, the operator may observe the reconstructed image and other data relevant to the system from computer 36, initiate imaging, and so forth.

A display 42 coupled to the operator workstation 40 may be utilized to observe the reconstructed image. Additionally, the scanned image may also be printed by a printer 44, which may be coupled to the operator workstation 40. The display 42 and printer 44 may also be connected to the computer 36, either directly or via the operator workstation 40. The operator workstation 40 may also be coupled to a picture archiving and communications system (PACS) 46. It should be noted that PACS 46 might be coupled to a remote system 48, radiology department information system (RIS), hospital information system (HIS) or to an internal or external network, so that others at different locations may gain access to the image data. Additionally, a computer aided diagnosis (CAD) unit 50 may be operably coupled to the computer 36. It may be noted that the CAD unit 50 may include software configured to apply a CAD algorithm to the image data. Further, the CAD unit 50 may also be coupled to the display 42, where the image data may be displayed on the display. In practice, the CAD unit 50 may be part of the data acquisition system 34, or may be a completely separate component, typically remote from the data acquisition system 34, and configured to analyze image data stored on a memory, such as the PACS 46.

It should be further noted that the computer 36 and operator workstation 40 may be coupled to other output devices, which may include standard or special purpose computer monitors and associated processing circuitry. One or more operator workstations 40 may be further linked in the system for outputting system parameters, requesting examinations, viewing images, and so forth. In general, displays, printers, workstations, and similar devices supplied within the system may be local to the data acquisition components, or may be remote from these components, such as elsewhere within an institution or hospital, or in an entirely different location, linked to the image acquisition system via one or more configurable networks, such as the Internet, a virtual private network or the like.

Figure 2:
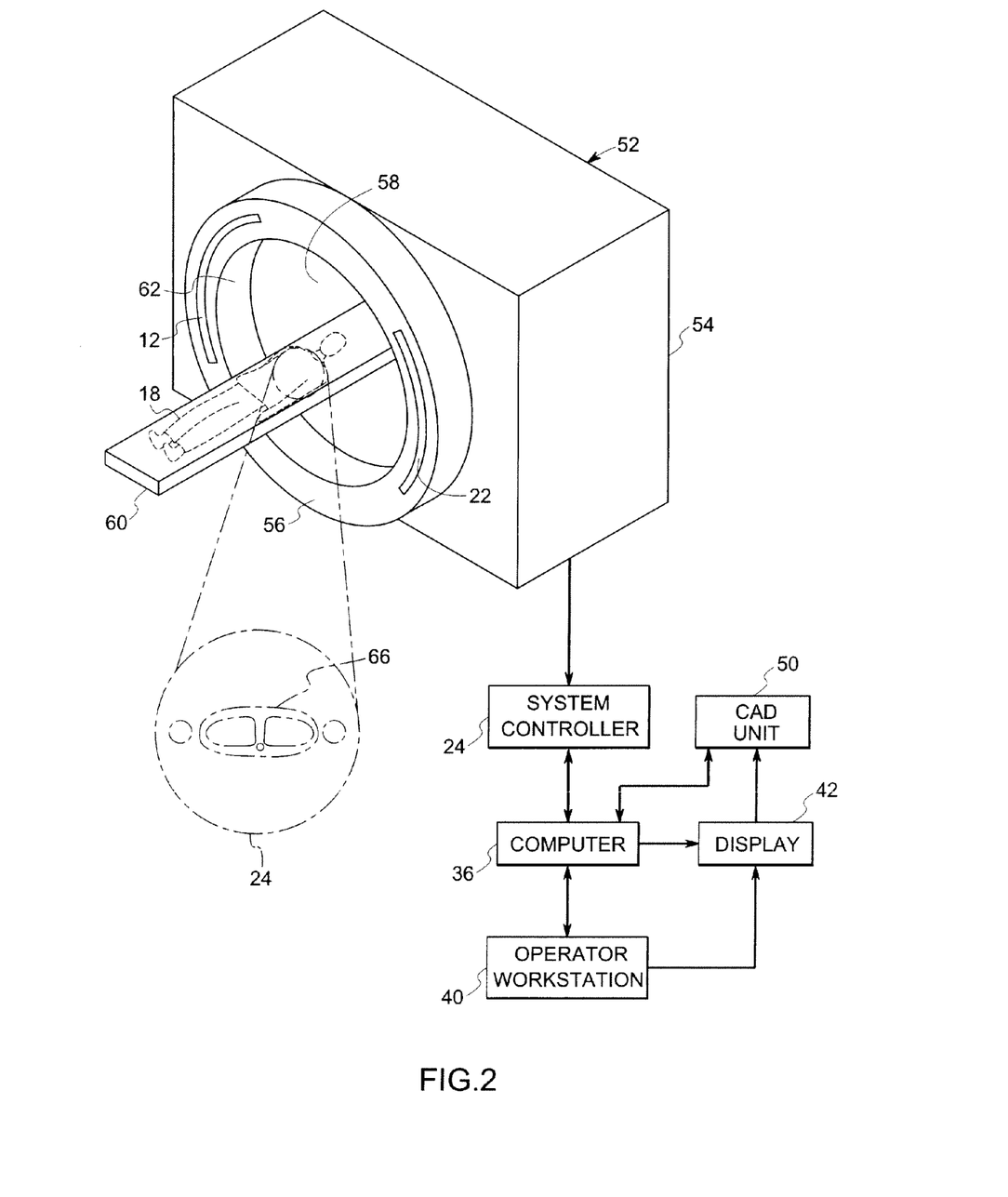
FIG. 2 is a diagrammatical view of a physical implementation of the CT system of FIG. 1.

As noted above, an exemplary imaging system utilized in a present embodiment may be a CT scanning system 52, as depicted in greater detail in FIG. 2. The CT scanning system 52 may be a multi-slice detector CT (MDCT) system that offers a wide array of axial coverage, high gantry rotational speed, and high spatial resolution. Alternately, the CT scanning system 52 may be a volumetric CT (VCT) system utilizing a cone-beam geometry and an area detector to allow the imaging of a volume, such as an entire internal organ of a subject, at high or low gantry rotational speeds. The CT scanning system 52 is illustrated with a frame 54 and a gantry 56 that has an aperture 58 through which a patient 18 may be moved. A patient table 60 may be positioned in the aperture 58 of the frame 54 and the gantry 56 to facilitate movement of the patient 18, typically via linear displacement of the table 60 by the linear positioning subsystem 28 (see FIG. 1). The gantry 56 is illustrated with the source of radiation 12, such as an X-ray tube that emits X-ray radiation from a focal point 62. For cardiac imaging, the stream of radiation is directed towards a cross section of the patient 18 including the heart.

In typical operation, the X-ray source 12 projects an X-ray beam from the focal point 62 and toward detector array 22 (see FIG. 1). The collimator 14 (see FIG. 1), such as lead or tungsten shutters, typically defines the size and shape of the X-ray beam that emerges from the X-ray source 12. The detector 22 is generally formed by a plurality of detector elements, which detect the X-rays that pass through and around a subject of interest, such as the heart or chest. Each detector element produces an electrical signal that represents the intensity of the X-ray beam at the position of the element at the time the beam strikes the detector 22. The gantry 56 is rotated around the subject of interest so that a plurality of radiographic views may be collected by the computer 36.

Thus, as the X-ray source 12 and the detector 22 rotate, the detector 22 collects data related to the attenuated X-ray beams. Data collected from the detector 22 then undergoes pre-processing and calibration to condition the data to represent the line integrals of the attenuation coefficients of the scanned objects. The processed data, commonly called projections, may then be filtered and backprojected to formulate an image of the scanned area. A formulated image may incorporate, in certain modes, less or more than 360 degrees of projection data. Once reconstructed, the image produced by the system of FIGS. 1 and 2 reveals internal features 66 of the patient 18.

The reconstructed image may be further analyzed using a CAD algorithm to enable a radiologist examining the image to identify certain anatomical structures in the image. For example, the CAD algorithm can be used to label lung nodules in CT images of the lungs and polyps in images of the colon, identify lesions in liver images, identify aneurysms in neural and cardiac images, detect pulmonary embolisms in lung images, vessel tree extraction and junction/branch detection The CAD algorithm is configured to identify several regions of interest in the image and process the regions to compute a corresponding region score. The region score is then used to label the anatomical structures for further diagnosis. The manner in which the algorithm is applied to the image is described in further detail in FIG. 3.

Figure 3:
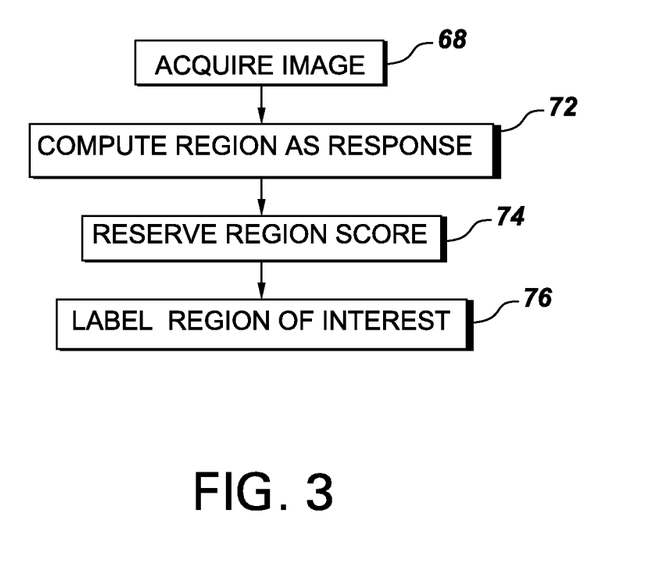
FIG. 3 is a flow chart illustrating exemplary steps in logic for carrying out image data processing based upon CAD analysis of acquired image data, in accordance with aspects of the present technique.

FIG. 3 represents a flow chart of exemplary steps in carrying out a processing routine based upon CAD analysis. The technique summarized in FIG. 3 begins at step 68 where image data may be acquired. In a CT system, for example, the image data acquisition of step 68 is typically initiated by an operator interfacing with the system via the operator workstation 40 (see FIG. 1). Readout electronics detect signals generated by virtue of the impact radiation on the scanner detector, and the system processes these signals to produce useful image data. However, as will be appreciated by one skilled in the art, image data may also be accessed from image acquisition devices, such as, but not limited to, magnetic resonance imaging (MRI) system, positron emission tomography (PET) system, a single photon emission computed tomography (SPECT) system or digital radiography systems. In addition, while the image acquisition devices mentioned hereinabove may be used to directly acquire image data from a patient 18 (see FIG. 1), image data may instead include data from an archive site or data storage facility.

After acquiring the image, a region in the acquired image is identified. In one embodiment, the region includes a pixel of interest or a voxel of interest. The region may comprise several voxels or pixels. In one embodiment, each voxel in the image is thresholded to identify the region. The region usually represents various anatomical structures such as lung nodules, vessels, etc.

In step 72, a regional response of the region is computed. In one embodiment, the regional responses of a non-linear filter are computed for the voxel of interest. Regional response is defined as a response computed for the region and/or a specified neighborhood of voxels around the region. In one embodiment, the size of the neighborhood voxels identified can be set based on the size of the structures of interest to be identified. A particular embodiment uses the principal curvatures of isosurfaces at each voxel as the regional response.

In step 74, a region score is computed for the identified region using a plurality of probabilistic models. The region score represents a value that indicates a likelihood of the region belonging to a specific anatomical structure such as vessel or a nodule. In one embodiment, the region score comprises of the probability of observing the given curvature data for the region due to a specific anatomical structure. In another embodiment, the region score comprises of a function of the intensity data for the region.

In step 76, the region is labeled by using the region score. In a further embodiment, the labeled regions may be displayed to a radiologist with different colors for different anatomical structures for better visualization of the image.

The probabilistic models are derived by approximating or modeling an anatomical structure through a geometric shape or a combination of geometric shapes. The anatomical structures are then represented using model parameters. The distribution of the response is derived as a function of the model parameters. Each model has its parameters and these parameters have a range of values that they can assume.

In a further embodiment, a probability distribution describing the likeliness of a particular parameter assuming a particular value is also derived. For deriving such a distribution, geometric and physical constraints are applied along with the incorporation of existing medical knowledge. In a more specific embodiment, the probability distribution of responses are computed for specific shape models that are absent and/or for noisy images.

The technique described in FIG. 3 can be applied to various medical images. One specific application of the present technique is identifying nodules and vessels in CT images of the lungs used for the detection of lung cancer. An example computation of a region score and the subsequent labeling of the image are described in detail below.

In one embodiment, a Bayesian framework is used for the computation of the region score. Let $M=\{M_i, i=1,\ldots,N\}$, be a set of parametric models with parameter $m_i$ in the domain $M_i$, that is $m_i \epsilon M_i$. One of the $M_i$ representing each possible label is to be attached to data 'D' associated to a voxel 'x'. In a Bayesian formulation, the region score for each model Miϵ can be computed by using Bayes' law:

$$p(Mi \mid D, x) = \frac{p(D \mid Mi, x) P(Mi \mid x)}{p(D \mid x)}$$

The label for the voxel 'x' can then be assigned through some function that compares the region score for the different models. In one embodiment, the label assigned is the one corresponding to the model with the maximum evidence, i.e., $$M^* = \underset{Mi}{\operatorname{argmax}}(p(Mi \mid D, x))$$

Assuming D to be a set of individual data $D_j$, i.e., $D=\{Dj, j=1, \ldots, M\}$, three alternatives paths can be followed. The first path is to assume that each datum $D_j$ is independent of every other distinct datum in the set D given a choice of model $M_i$, followed by marginalization over $m_i \in M_i$, i.e., $$P(Mi \mid D, x) = \frac{P(M_i \mid x)}{p(D \mid x)} \times \prod_j \int p(Dj \mid m_i, M_i, x) p(m_i \mid M_i, x) dm_i \quad \text{Equation (1)}$$

The second path is to assume that each datum $D_j$ is independent of every other distinct datum in the set D given a choice of model $M_i$ and its parameters $m_i$, again followed by marginalization over $m_i \in M_i$, i.e., $$P(Mi \mid D, x) = \frac{P(M_i \mid x)}{p(D \mid x)} \times \int_{m_I} \prod_j p(Dj \mid m_i, M_i, x) p(m_i \mid M_i, x) dm_i \quad \text{Equation (2)}$$

The third path is to not to assume any independence but marginalize over $mi \in Mi$, i.e., $$P(Mi \mid D, x) = \frac{P(M_i \mid x)}{p(D \mid x)} \times \int_{m_I} p(D \mid m_i, M_i, x) p(m_i \mid M_i, x) dm_i \quad \text{Equation (3)}$$

To compute the region score 'p(Dj|mi, Mi, x)' in equation (1), a parametric model $M_i$ and the datum $Dj \in D$ for the set D associated to the voxel 'x' is defined. In one embodiment, an outlier model $M_1$, a nodule model $M_2$, a vessel model $M_3$, a pleural or wall nodule model $M_4$, a pleural or wall ridge model $M_5$, and a junction model $M_6$ are considered. The last five models, jointly referred to as anatomical models, are representative of the structures that can be found in lungs. The first model is a catch-all for all models that does not correspond to any one of the anatomical models. The first model is used to account for variability in the anatomical models.

As described in FIG. 3, in one embodiment the regional response comprises curvature data of the voxel. The manner in which the curvature data is computed is described below. A volume image 'I' is defined as a twice differentiable mapping from a compact sub-domain $R^3$ into R. For any given $I_0$, $I(x)=0$ defines an isosurface at pints 'x' and $\nabla I(x) \neq 0$. The principal curvatures 'K' of the isosurface is given by the following equation:

$$K = \frac{\min}{\max} \frac{-v^T Z^T H Z v}{\|\nabla I\|} \quad \text{Equation (4)}$$

where the orthonormal columns of the 3×2 matrix Z span the null space of $\nabla I$.

The matrix $C=-Z^T H Z / \|\nabla I\|$ represents the curvature data of the volume image at voxel 'x'. The curvature data thus obtained is compared to the curvature data of the nodule model $M_2$ to estimate the likelihood of the voxel to be labeled a nodule. The manner in which nodule model is generated is described below.

Typically, the nodule model $M_2$ chosen to represent a nodule is a solid ellipsoid with similar concentric ellipsoidal isosurfaces such that the outermost isosurface is an ellipsoid with semi-axis given by $a=b<=c$, where a, b and c are the lengths of the three semi-axes, i.e., $$M_2 : \rho \times \theta \times \Phi \longrightarrow R^3$$

$$(\rho, \theta, \varphi) \rightarrow \begin{bmatrix} a\rho\cos\theta\cos\phi \\ a\rho\sin\theta\cos\phi \\ c\rho\sin\phi \end{bmatrix}$$

where $\rho=[0, 1]$, $\theta=[0, 2\pi)$, $\Phi=[-\pi/2, \pi/2]$, and each choice of $\rho \in \Pi$ defines a different isosurface.

Let 'x' be a point in the range $R_2 \subset R^3$ of $M_2$, randomly chosen according to a uniform distribution on $R_2$, i.e., the probability that 'x' will be inside a subregion of $M_2$ depends on the volume measure of the subregion. Consider the random variables $\Pi_2$, $\Phi_2$ given by:

$$\Pi_2 : R_2 \rightarrow R, x \longmapsto \rho(x) \in \Pi$$

$$\Phi_2 : R_2 \rightarrow R2, x \longmapsto \phi(x) \in \Phi$$

The joint cumulative probability distribution function of $\Pi_2$ and $\Phi_2$, $P_{\Pi2, \Phi2}(\rho, \phi)$ is computed from the expression for the fractional volume of the solid obtained from the ellipsoid $M_2$ when only the subset $(0, \rho) \times \theta \times (-\pi/2, \phi)$ of its domain is considered, and is given by:

$$P_{\Pi2, \Phi2}(\rho, \phi) = (\rho^3(\sin \phi + 1))/2$$

Therefore, the joint probability density $P_{\Pi2, \Phi2}(\rho, \phi)$ of $\Pi_2$ and $\Phi_2$ is:

$$P_{\Pi2, \Phi2}(\rho, \phi) = 3\rho^2(\cos \phi)/2 * I(\rho)I\phi(\Phi)$$

Now consider, the random vector $K: R_2 \rightarrow R$, $x \longmapsto k(x) = (k_1, k_2)$. Using standard results in transformations of random variables and considering a probability $\alpha_2$ of an outlier, the joint probability density $\rho_{K2}(K|a, c)$ of $K_1^2$ and $K_2^2$ from, produces $$\rho_{K2}(K \mid a, c) = \quad \text{Equation (5)}$$

$$\alpha_2 p_K^1(\kappa \mid \sigma) + \frac{3(1-\alpha_2)c^3}{2a4\sqrt{k_2^9(c^2-a^2)(c^2k_1-a^2k_2)}} I_{Ka,c}^2(K)$$

where $\kappa_{a,c}^2(K)$ is the set and $$K_{a,c}^2(K) = \left\{ K \varepsilon R^2 \mid \frac{a}{c^2} \le \kappa_1, \text{ and} \right.$$

$$\operatorname{Max}\left(k1, \left(\frac{c^2 k_1}{a^4}\right)^{1/3}\right) \le k_2 < \frac{c^2}{a^2} k_1$$

The models for the vessel $M_3$, a pleural or wall nodule $M_4$, a pleural or wall ridge $M_5$, and a junction $M_6$ can be generated using the same technique described above. The region score generated by equation (4) can be compared with the probability density of the nodule model as described in equation (5) to determine the probability of the region being a nodule.

As can be seen from the techniques described above the computer 36 may use the computer aided diagnosis (CAD) unit 50 to identify regions of interest in the image. The computer processor is configured to process the data corresponding to the regions of interest to produce a region score. The region score is then compared to the various models that can be generated using the techniques described above to identify and label the anatomical structures in the image.

The above described invention has several advantages including robust and accurate estimates of identifying and labeling the region as the computation takes into consideration a neighborhood of voxels around the region and probabilistic models computed from various geometrical shapes.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for assigning labels to regions in an image, the method comprising:
   deriving, by a processor, a plurality of probabilistic models for a plurality of geometrical structures;
   computing, by a processor, a regional response around a region in the image;
   computing, by a processor, a region score for each geometrical structure using the plurality of probabilistic models; and
   labeling, by the processor, the region in the image based on the region score.

2. The method of claim 1, wherein the geometrical structures comprise anatomical structures and the labeling comprising labeling the anatomical structures.

3. The method of claim 2, wherein the anatomical structure is one of a nodule, a vessel, a polyp, a tumor, a lesion, a fold, an aneurysm and a pulmonary embolism.

4. The method of claim 1, wherein the deriving the probabilistic models comprises:
   modeling, by a processor, the anatomical structures using a plurality of geometric models; and
   representing, by the processor, the anatomical structures using model parameters.

5. The method of claim 4, wherein computing the regional response comprises computing the regional response as a function of the geometrical models and the model parameters.

6. The method of claim 5, further comprising deriving, by the processor, a distribution of the regional response as a function of the model parameter.

7. The method of claim 6, wherein the deriving the distribution comprises applying a knowledgebase of anatomical and functional information.

8. The method of claim 6, further comprising deriving, by the processor, a distribution of the regional responses for noisy regions in the image.

9. The method of claim 1, wherein the regional response comprises of a response at a pixel of interest or a voxel of interest.

10. The method of claim 1, wherein the regional response comprises of a response at a neighborhood around a pixel of interest or a voxel of interest.

11. The method of claim 1, wherein the regional response comprises of principal curvatures for the region.

12. The method of claim 1, wherein the regional response comprises of a function of the intensity or texture data for the region.

13. The method of claim 1, further comprising identifying, by the processor, a set of regions from the image.

14. The method of claim 13, wherein the identifying comprises thresholding each pixel or voxel in the image to identify the regions of interest.

15. The method of claim 1, wherein the image comprises a medical image.

16. The method of claim 1, wherein the image comprises a two-dimensional image, a three-dimensional image, a four-dimensional image, or a five-dimensional image.

17. The method of claim 1, further comprising displaying the labeled regions and assigning a respective color for each label for visualizing the corresponding regions of interest.

18. A medical imaging system for labeling anatomical structures in an image, the system comprising,
   an image processor configured to:
      compute a regional response around a voxel of interest in the image;
      compute a voxel score for each anatomical structures based on a volume measure of the anatomical structure for a plurality of probabilistic models;
      label the voxel of interest in the image based on the voxel score; and
   a display unit configured to display the image including the labeled anatomical regions.

19. The imaging system of claim 18, wherein the probabilistic models comprise histograms.

20. The imaging system of claim 19, wherein the histograms include parameters obtained from fixed shapes and a distribution of shapes.

21. The imaging system of claim 18, wherein the regional response comprises a geometric response for the image voxel.

22. The imaging system of claim 18, wherein the regional response comprises an intensity response for the image voxel.

23. The imaging system of claim 18, wherein the anatomical regions include vessels, nodules, polyps, folds, aneurysm or junctions of vessels trees.

24. The imaging system of claim 18, wherein the imaging system comprises at least one of a computed tomography (CT) system, positron emission tomography (PET) system, a single photon emission computed tomography (SPECT) system, magnetic resonance imaging system, microscopy or a digital radiography system.

25. A computed tomography (CT) system for labeling anatomical structures in a CT image, the system comprising,
   an image processor configured to:
      compute a regional response around a voxel of interest in the CT image;
      compute a voxel score for each anatomical structures based on a plurality of probabilistic models;
      label the voxel of interest in the image based on the voxel score; and
   a display unit configured to display the CT image including the labeled anatomical structures.

26. The CT system of claim 25, wherein image processor is configured to develop the plurality of probabilistic models using a distribution of geometrical parameters.

27. The CT system of claim 25, wherein image processor is configured to label the voxel of interest using probabilistic models for curvature data in a neighborhood of the voxel of interest.

28. A non-transitory computer-readable medium storing computer instructions for instructing a computer system to code uncompressed data, the computer instructions including:
- deriving, by a processor, a probabilistic model for a plurality of geometrical structures;
- computing, by a processor, a regional response around a region in the image;
- computing, by a processor, a region score for each geometrical structure using the plurality of probabilistic models; and
- labeling, by a processor, the region in the image based on the region score.

29. The system of claim 28, wherein the geometrical models comprise anatomical structures.

30. The system of claim 29, wherein the deriving, processor, the probabilistic models comprises:
- modeling, by a processor, the anatomical structures using a plurality of geometric models; and
- representing the anatomical structures using model parameters.

31. The system of claim 28, wherein computing the regional response comprises computing the regional response as a function of the geometrical models and the model parameters.

32. The system of claim 30, further comprising deriving, by the processor, a distribution of the regional response as a function of the model parameter, wherein the deriving the distribution comprises applying a knowledgebase of anatomical and functional information.

33. The system of claim 31, further comprising deriving, by the processor, a distribution of the regional responses for noisy regions in the image.

* * * * *

UNITED STATES PATENT AND TRADEMARK OFFICE
CERTIFICATE OF CORRECTION

PATENT NO. : 8,923,577 B2  
APPLICATION NO. : 11/558715  
DATED : December 30, 2014  
INVENTOR(S) : Mendonca et al.

Page 1 of 1

It is certified that error appears in the above-identified patent and that said Letters Patent is hereby corrected as shown below:

In the Specification

Column 1, line 18 under STATEMENT REGARDING FEDERALLY SPONSORED RESEARCH & DEVELOPMENT, delete "W81XWH-1-0378" and insert -- W81XWH-05-1-0378" --, therefor.

Signed and Sealed this
Fourteenth Day of April, 2015

Michelle K. Lee
*Director of the United States Patent and Trademark Office*